US008953796B2

(12) United States Patent
An et al.

(10) Patent No.: US 8,953,796 B2
(45) Date of Patent: Feb. 10, 2015

(54) TECHNIQUES FOR ACCESSING FEATURES OF A HARDWARE ADAPTER

(75) Inventors: Jiandi An, Round Rock, TX (US); Omar Cardona, Cedar Park, TX (US); Matthew R. Ochs, Austin, TX (US); Kent E. Yoder, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 13/172,608

(22) Filed: Jun. 29, 2011

(65) Prior Publication Data

US 2013/0003976 A1    Jan. 3, 2013

(51) Int. Cl.
*H04L 9/00* (2006.01)
*H04L 9/08* (2006.01)
*G06F 21/85* (2013.01)

(52) U.S. Cl.
CPC .............. *H04L 9/0825* (2013.01); *G06F 21/85* (2013.01)
USPC .............................................. 380/228; 718/1

(58) Field of Classification Search
None
See application file for complete search history.

(56) References Cited

U.S. PATENT DOCUMENTS

| 7,684,565 B2 * | 3/2010 | Medvinsky ..................... 380/44 |
| 2005/0144436 A1 | 6/2005 | Chen et al. |
| 2010/0017624 A1 | 1/2010 | Chan et al. |
| 2011/0154455 A1 * | 6/2011 | Nanjangudu et al. ............. 726/6 |

OTHER PUBLICATIONS

Guenzel, Robert, Automatic Integration of Non-bus Hardware IP Into SoC-platforms for Use by Software, pp. 59-65, IEEE/IFIP International Conference on Embedded and Ubiquitous Computing 2008.
Microsoft/Intel, IP Security Features—Intel Ethernet Server Adapters and Microsoft Windows Server 2008; pp. 1-12, Technical White Paper; 2008-2009.
Cook, Jim et al., Managing OS/400 with Operations Navigator V5R1—vol. 2: Security, IBM.com/redbooks, Jan. 2003.

* cited by examiner

*Primary Examiner* — Kambiz Zand
*Assistant Examiner* — Leynna Truvan
(74) *Attorney, Agent, or Firm* — Yudell Isidore PLLC; Matthew Talpis

(57) ABSTRACT

A technique for accessing features of a hardware adapter includes reading a first key from a hardware adapter and attempting to decrypt the first key with a second key. In response to the second key successfully decrypting the first key: encrypted code from the hardware adapter is read; the encrypted code is decrypted with the decrypted first key to generate unencrypted code; and a default code in an executable flash sector of the hardware adapter is over-written with the unencrypted code. In this case, the unencrypted code facilitates access to at least one feature of the hardware adapter that is customer specific. In response to the second key not successfully decrypting the first key, the default code in the executable flash sector of the hardware adapter is not over-written. In this case, the default code facilitates access to one or more features that are not customer specific.

25 Claims, 6 Drawing Sheets

TECHNIQUES FOR ACCESSING FEATURES OF A HARDWARE ADAPTER

BACKGROUND

1. Technical Field

The present invention generally relates to hardware adapters and in particular to techniques for accessing features of a hardware adapter.

2. Description of the Related Art

In electronics, the term 'firmware' is often used to denote fixed, relatively small programs and/or data structures that internally control various electronic devices. Electronic devices that include firmware range from end-user products (e.g., remote controls, mobile phones, digital cameras, and calculators) to computer peripherals (e.g., hard disk drives (HDDs), keyboards, and memory cards). The term 'firmware' was originally coined in order to differentiate from higher level software, which could be changed without replacing a hardware component.

Firmware is typically directed to basic low-level operations without which an electronic device would be non-functional. However, the term 'firmware' is also relative as most embedded devices contain firmware at more than one level. For example, various subsystems (e.g., central processing units (CPUs) and communication controllers) may have their own (usually fixed) program code and/or microcode, which is regarded as part of the hardware by higher level firmware. Typically, low-level firmware resides in a read-only memory (ROM), while high-level firmware resides in flash memory to allow for updates. Common reasons for updating firmware include fixing bugs and/or adding features to an electronic device. Updating firmware usually involves loading a binary image file (e.g., provided by a manufacturer) into an electronic device according to a specific procedure.

When entities collaborate in defining a product that employs hardware and software, the entities usually seek to protect their input from being exploited by competitors without compensation. As one example, when a software feature implemented in a computer system drives an architectural design of a hardware adapter, an originator of the software feature may seek to protect their input from being exploited by competitors without compensation.

A known solution for tying a hardware adapter to a computer system has involved providing a specific vendor identifier (ID) and/or sub-vendor ID from a manufacturer of the system to a manufacturer of the adapter. Following this approach, a device driver (e.g., implemented within an OS or within a virtual machine monitor (VMM)) of the system has been configured to verify that a hardware adapter includes the specific vendor ID and/or sub-vendor ID (i.e., that the adapter is a certified adapter) prior to configuring the adapter. In the event a non-certified hardware adapter is placed in a computer system that is configured to verify a hardware adapter by specific vendor ID and/or sub-vendor ID, the non-certified hardware adapter is not recognized by the system and, as such, is not configured. However, the known solution for tying a hardware adapter to a computer system does not prevent the adapter from being placed in a product of a competitor. In this case, a competing product may utilize all features implemented within the adapter.

BRIEF SUMMARY

Disclosed are a method, a data processing system, and a computer program product (embodied on a computer-readable storage medium) for accessing features of a hardware adapter.

A technique for accessing features of a hardware adapter includes reading a first key from a hardware adapter and attempting to decrypt the first key with a second key. In response to the second key successfully decrypting the first key: encrypted code from the hardware adapter is read; the encrypted code is decrypted with the decrypted first key to generate unencrypted code; and a default code in an executable flash sector of the hardware adapter is over-written with the unencrypted code. In this case, the unencrypted code facilitates access to at least one feature of the hardware adapter that is customer specific. In response to the second key not successfully decrypting the first key, the default code in the executable flash sector of the hardware adapter is not over-written. In this case, the default code facilitates access to one or more features that are not customer specific.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

Figure 1:
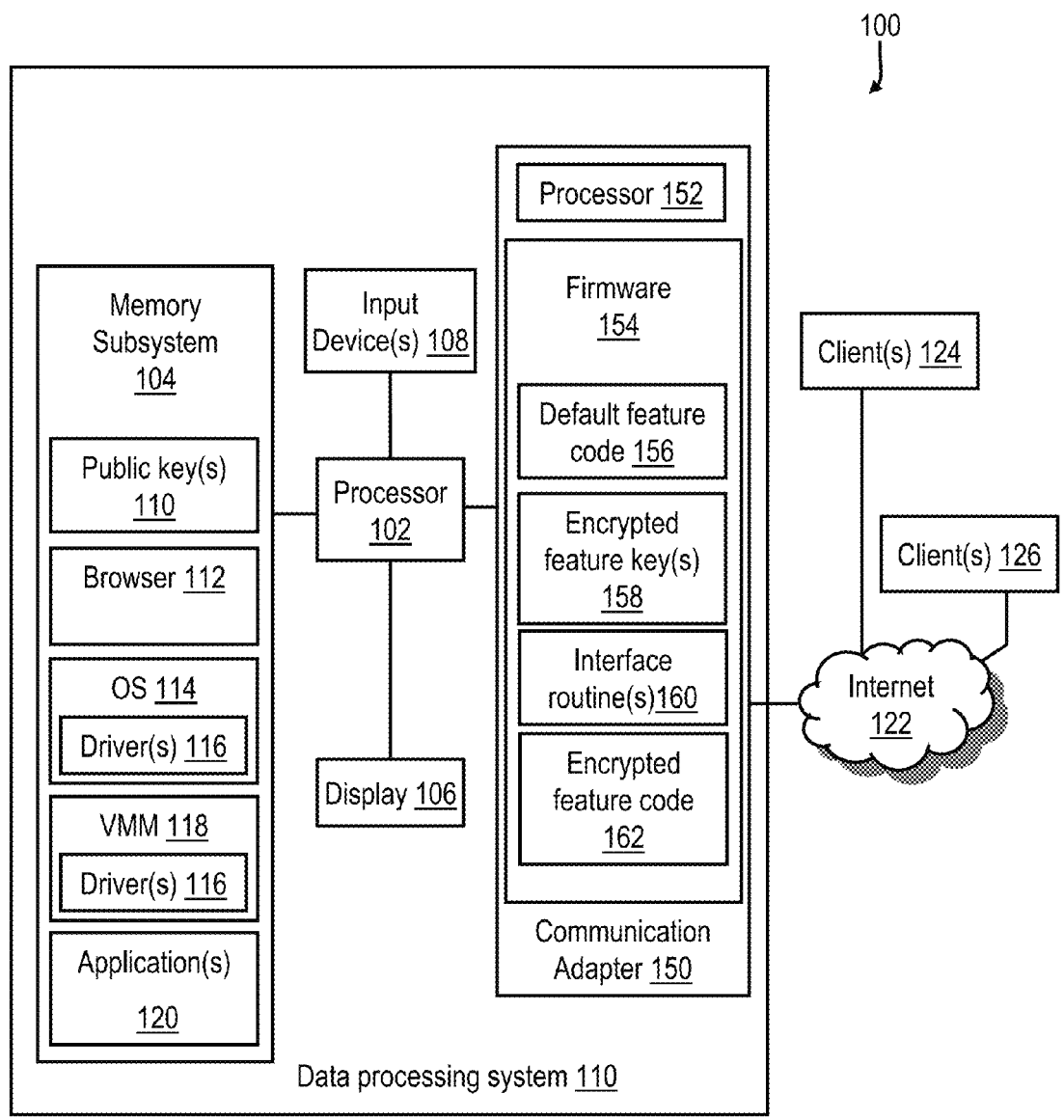
FIG. 1 is a diagram of a relevant portion of an exemplary data processing system environment that includes a data processing system and hardware adapter configured in accordance with various embodiments of the present disclosure.

The illustrative embodiments provide a method, a data processing system, and a computer program product (embodied on a computer-readable storage medium) for accessing features of a hardware adapter.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention.

The following detailed description is, therefore, not to be taken in a limiting sense, and the scope of the present invention is defined by the appended claims and equivalents thereof.

It is understood that the use of specific component, device, and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

The disclosed techniques may be employed to, for example, protect operating system (OS) and virtual machine monitor (VMM) innovations by restricting the use of hardware adapter features to authorized OSs and VMMs (hypervisors). In various embodiments, if a hardware adapter is placed in a computer system that executes an unauthorized OS and/or VMM, adapter features associated with an authorized OS and/or VMM are not available. The disclosed techniques facilitate enablement of capacity upgrade on demand (CuOD) hardware adapter features that can serve to generate additional revenue. According to various aspects of the present disclosure, techniques are disclosed that allow a computer system manufacturer to control the use of enhanced features incorporated in a hardware adapter, irrespective of the manufacturer of the adapter or data processing system in which the adapter is deployed. The disclosed techniques prevent the exploitation of vendor ID and/or sub-vendor ID spoofing, which may be employed to allow a non-certified hardware adapter (i.e., a commodity hardware adapter) to utilize enhanced features provided by device drivers of a computer system.

Currently, communication adapters are converging in features. For example, Fibre Channel (FC) and InfiniBand (IB) are currently being transitioned to Ethernet as a common fabric. According to various aspects of the present disclosure, hardware adapter management is vendor specific and is provided via a hardware adapter firmware interface. A hardware adapter firmware interface approach provides an abstraction layer between a hardware adapter and a OS or VMM. According to one embodiment, adapter firmware is enhanced and extended to perform symmetric key (clear feature key) exchange to enable hardware features of the adapter only when an appropriate computer system manufacturer key is provided.

According to one embodiment, when an OS or VMM attempts to access specific features of a hardware adapter, a key exchange occurs that enables the features when the key is valid. If the key is invalid, the features are not enabled. The key exchange mechanism also facilitates CuOD, where a customer can enable additional features of a hardware adapter (e.g., via a network) in the same manner as is currently used for memory and CPU CuOD. Advantageously, the disclosed techniques may allow a hardware adapter manufacturer to reduce costs and increase volume by having a single design which can be sold to function with multiple OSs and/or VMMs of different manufacturers. In this manner, the need for customized adapter hardware is avoided, as certain features may be restricted to authorized OSs and/or VMMs that include a valid cryptographic key. A hardware adapter may have features that are enabled as a set for a specific customer or may have features enabled individually for a specific customer.

When a feature set of a hardware adapter is controlled according to an embodiment of the present disclosure, adapter firmware that stores code for the feature set is encrypted with a symmetric key. The symmetric key is then encrypted (via a vendor specified private key encryption algorithm) and stored in firmware of the adapter. In one or more embodiments, a symmetric key (clear feature key) is unique for each adapter and the vendor private/public key pair is unique for each customer. According to the present disclosure, a customer with authorized key may, for example, unlock a feature or a set of features specified in an agreement.

For example, according to one embodiment, an OS device driver of a specific customer is configured to read out an encrypted symmetric key from a hardware adapter. The encrypted symmetric key is then decrypted with a vendor specific public key for the specific customer. Using a vendor specific public key for each customer facilitates enablement of a specific feature (or feature set) for a specific customer. An OS device driver of the customer then performs a hardware adapter firmware download to read out encrypted adapter firmware from adapter ROM. The OS device driver then attempts to decrypt the encrypted adapter firmware with the symmetric key to enable a set of features specifically authorized for the customer. If decryption fails due to an invalid key, the OS device driver may be configured to run with default adapter firmware that was previously stored in an executable flash sector of the adapter. When the decryption is successful, the OS device driver initiates flashing the decrypted adapter firmware (that includes the enabled set of features) into the executable flash sector of the adapter, replacing the default adapter firmware (or an appropriate portion thereof) in the executable flash sector. The OS device driver of the customer then calls the adapter firmware to enable the set of features.

According to another embodiment, a vendor private/public key pair, as well as symmetric keys for each feature that may be enabled, are unique. In this embodiment, each feature may be individually enabled on a per feature basis. In various embodiments, adapter firmware includes firmware interface routines for individually enabling features. Actual enablement of a feature is blocked if an invalid clear symmetric key is issued with a feature enable firmware interface call. In this embodiment, a feature may be unlocked for a customer when an OS device driver of the customer reads out an encrypted symmetric key for a particular feature from the adapter. The OS device driver decrypts the encrypted symmetric key with a vendor specific private key for the feature. The OS device driver then issues enablement commands via adapter firmware interface calls that utilize the decrypted symmetric key. In this case, a feature is enabled by the adapter if the symmetric key supplied by the OS is the correct key for enabling the feature. Otherwise the feature remains disabled.

It should be appreciated that virtually any feature implemented within a hardware adapter (e.g., a communication adapter, hardware accelerator, etc.) may be enabled according to the present disclosure. For example, features such as virtual switches, port mirroring, port sniffing, port replication, port pass-through, port intrusion prevention and detection, deep packet analysis, link aggregation control protocol (LACP) hardware negotiation, a number of available virtual functions (VFs), enhanced security access control lists (ACLs), and active port profile migration may be enabled within a communication adapter as individual features or feature sets according to the present disclosure. It should also be appreciated that the techniques disclosed herein are broadly applicable to hardware adapters, other than communication adapters.

With reference to FIG. 1, an exemplary data processing system environment 100 is illustrated that includes a data processing system 110 that is configured to facilitate access to certain features implemented in communication adapter 150. Data processing system 110 may take various forms, such as servers, laptop computer systems, desktop computer systems, etc. Data processing system 110 includes a processor 102 (which may include one or more processor cores for executing program code) coupled to a memory subsystem 104, a display 106, one or more input devices 108, and communication adapter 150.

Memory subsystem 104 may include, for example, application appropriate amounts of various memories (e.g., dynamic random access memory (DRAM), static RAM (SRAM), and read-only memory (ROM)), and/or one or more mass storage devices, such as magnetic or optical disk drives. Memory subsystem 104 includes an operating system (OS) 114 (that may include one or more device drivers 116) for data processing system 110, a virtual machine monitor (VMM) 118 (that may include one or more device drivers 116) for data processing system 110, one or more public keys 110, a browser 112 (which may optionally include customized plug-ins to support various client applications), and other applications (e.g., a word processing application, a presentation application, and an email application) 120.

Communication adapter 150 includes firmware 154 that may store default feature code 156, one or more encrypted feature keys 158, one or more interface routines 160, and encrypted feature code 162 that are executed by processor 152 of communication adapter 150. Respective public keys 110 are utilized to decrypt respective encrypted feature keys 158 stored in firmware 154 of communication adapter 150. As is discussed in further detail below, decrypted features keys may be utilized to decrypt encrypted feature code 162 stored in firmware 154 of communication adapter 150.

Display 106 may be, for example, a cathode ray tube (CRT) or a liquid crystal display (LCD). Input device(s) 108 of storage subsystem 110 may include, for example, a mouse, a keyboard, haptic devices, and/or a touch screen. Communication adapter 150 supports communication of data processing system 110 with one or more wired and/or wireless networks utilizing one or more communication protocols, such as 802.x, HTTP, simple mail transfer protocol (SMTP), etc. Data processing system 110 is shown coupled via one or more wired or wireless networks, such as the Internet 122, to various clients 124 and 126 that access information of interest (to users of clients 124 and 126) that is stored in data processing system 110 and/or that may be utilized to facilitate enablement of desired features of communication adapter 150.

Those of ordinary skill in the art will appreciate that the hardware components and basic configuration depicted in FIG. 1 may vary. The illustrative components within data processing system 110 are not intended to be exhaustive, but rather are representative to highlight components that may be utilized to implement the present invention. For example, other devices/components may be used in addition to or in place of the hardware depicted. The depicted example is not meant to imply architectural or other limitations with respect to the presently described embodiments.

Figure 2:
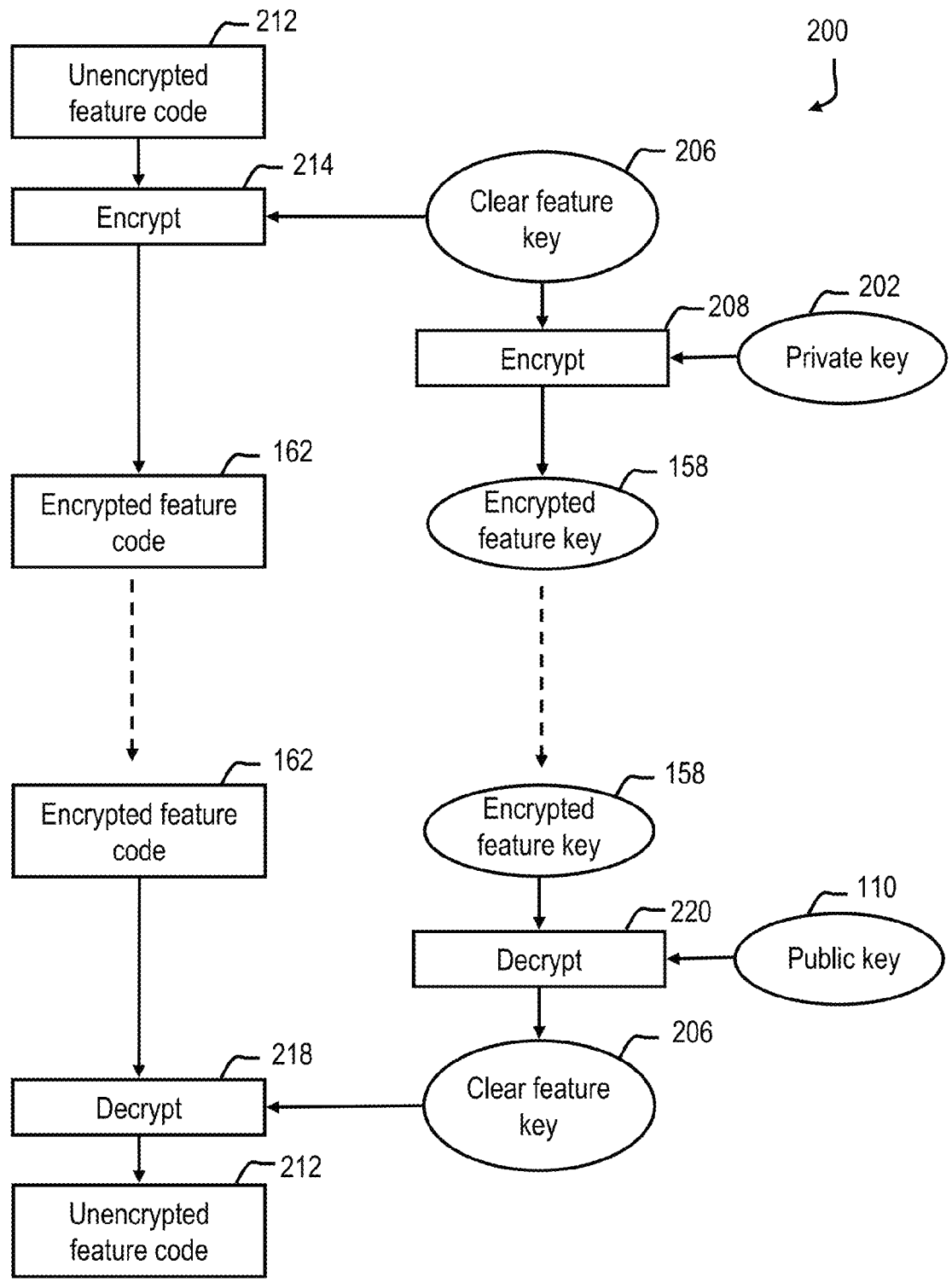
FIG. 2 is a exemplary diagram for encrypting/decrypting a symmetric key that is utilized to encrypt/decrypt firmware of a hardware (e.g., communication) adapter in accordance with an embodiment of the present disclosure.

With reference to FIG. 2, diagram 200 illustrates encryption/decryption techniques employed according to various embodiments of the present disclosure. For ease of understanding, diagram 200 is explained in conjunction with FIG. 1. Specifically, private key 202 (which has an associated public key 110 stored in memory subsystem 104) is utilized to encrypt (as shown at block 208) clear feature key (symmetric key) 206 to generate encrypted feature key 158 stored in firmware 154. Clear feature key 206 is also utilized to encrypt (as shown at block 214) unencrypted feature code 212 to generate encrypted feature code 162 stored in firmware 154. Public key 110 is utilized to decrypt (as shown at block 220) encrypted feature key 158 and generate clear feature key 206. Clear feature key 206 is utilized (by processor 102 or communication adapter 150) to decrypt (as shown at block 218) encrypted feature code 162 and generate unencrypted feature code 212 for communication adapter 150.

Figure 3:
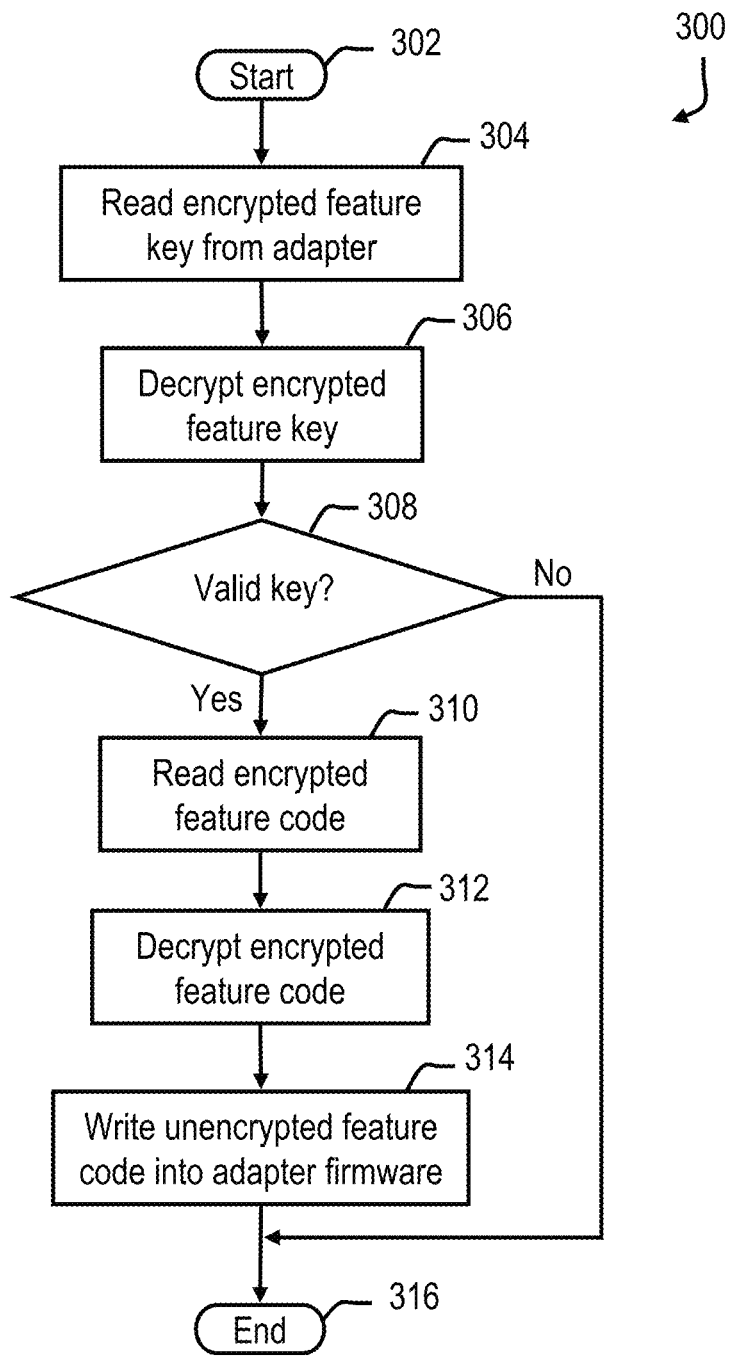
FIG. 3 is a flow chart of an exemplary process for implementing access to features of a hardware adapter in accordance with one embodiment of the present disclosure.

With reference to FIG. 3, a process 300 is illustrated that restricts access to features of a hardware adapter to authorized features according to an embodiment of the present disclosure. For ease of understanding, process 300 is explained in conjunction with FIG. 1. Process 300 is executed by processor 102 of data processing system 110. For example, process 300 may be implemented in driver 116 (included in OS 114 or VMM 118) for communication adapter 150.

Process 300 is initiated (e.g., at initial execution of driver 116 for communication adapter 150 by processor 102) in block 302, at which point control passes to block 304. In block 304, processor 102 reads an encrypted feature key 158 from communication adapter 150. Next, in block 306, processor 102 utilizes public key 110 to decrypt encrypted feature key 158. Then, in decision block 308, processor 102 determines whether the decryption of encrypted feature key 158 with public key 110 produces a valid key (i.e., clear feature key 206).

In response to a valid key not being indicated (i.e., if the decryption of encrypted feature key 158 using public key 110 is not successful) in block 308, control transfers to block 316, where process 300 terminates and control returns to a calling routine (as the feature to which access was attempted is not an authorized feature for communication adapter 150). In response to a valid key being indicated in block 308, control transfers to block 310, where processor 102 reads encrypted feature code 162 from firmware 154 of communication adapter 150. Next, in block 312, processor 102 decrypts encrypted feature code 162 (using clear feature key 206). Then, in block 314, processor 102 writes decrypted feature code 212 over default feature code 156 in adapter firmware 154. Following block 314, control transfers to block 316 where process 300 terminates and control returns to a calling routine.

Figure 4:
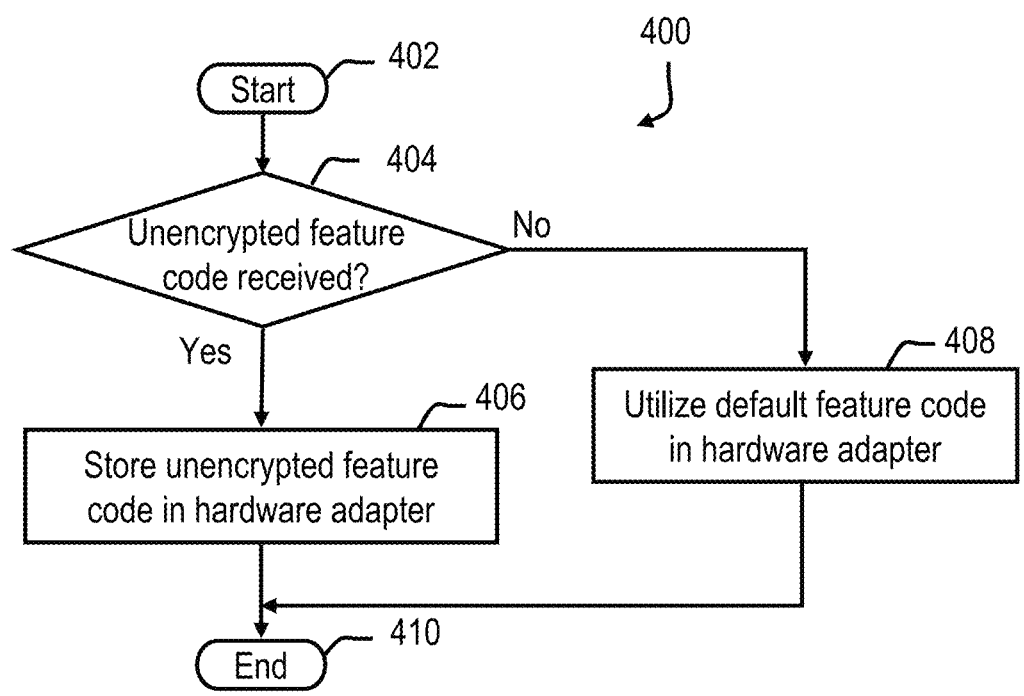
FIG. 4 is a flow chart of an exemplary process for implementing access to features of a hardware adapter according to another embodiment of the present disclosure.

With reference to FIG. 4, a flow chart of an exemplary process 400 (executed by processor 152 of communication adapter 150) is illustrated that utilized to enable authorized features of communication adapter 150. For ease of understanding, process 400 is explained in conjunction with FIG. 1. Process 400 may, for example, be implemented when processor 152 executes one or more interface routines 160 of communication adapter 150. At block 402, process 400 is initiated at which point control transfers to decision block 404. In block 404, processor 152 determines whether unencrypted feature code 212 (to replace default feature code 156) has been received from processor 102. In response to unencrypted feature code 212 being received from processor 102 in block 404, control transfers to block 406, where the unencrypted feature code 212 is written over default feature code 156 (or a relevant portion of default feature code 156). In response to unencrypted feature code not being received (e.g., within a predetermined time from initiation of execution of driver 116 for communication adapter 150 by processor 102) from processor 102 in block 404, control transfers to block 408, where processor 152 initiates execution of default feature code 156. Following blocks 406 and 408 control transfers to block 410 where process 400 terminates and control returns to a calling routine.

Figure 5:
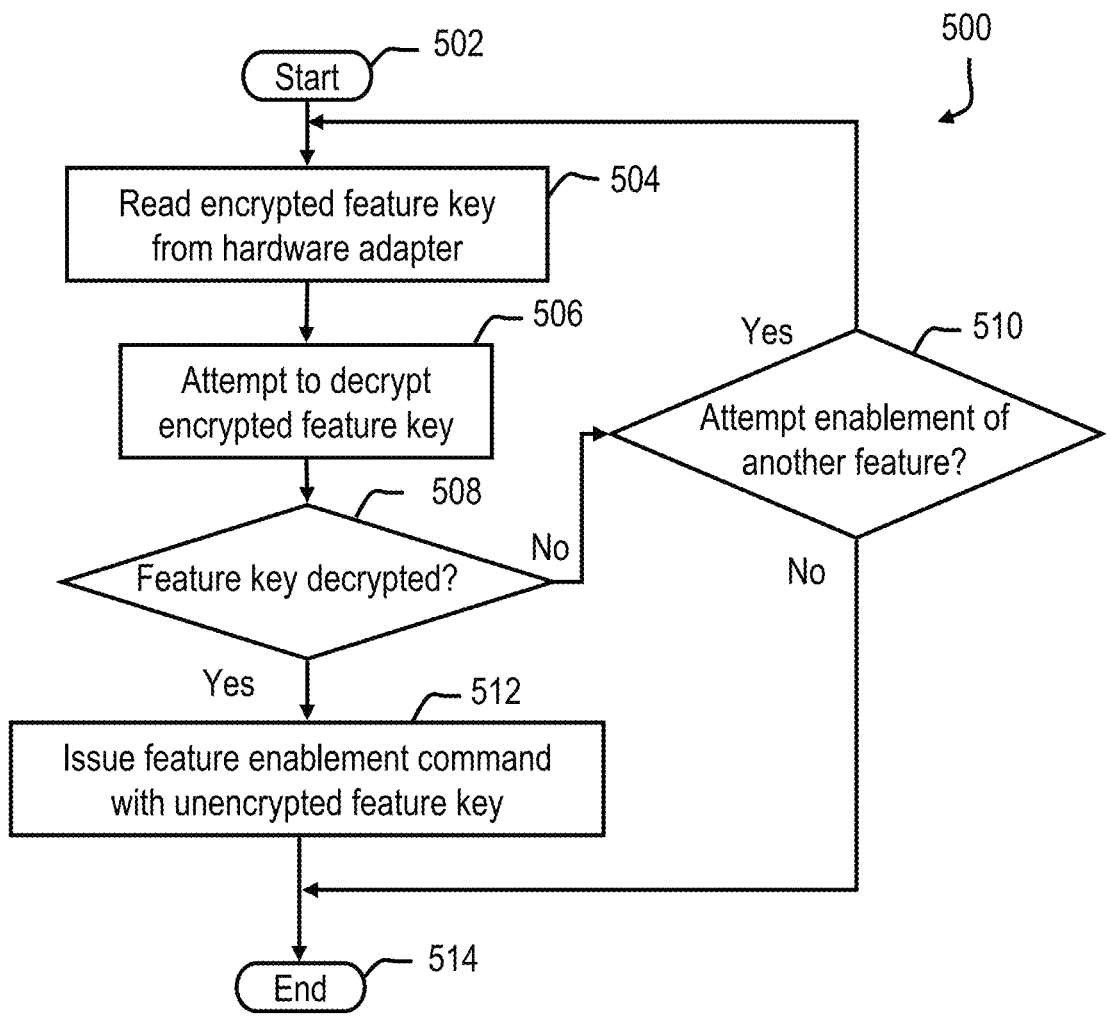
FIG. 5 is a flow chart of another exemplary process for implementing access to features of a hardware adapter according to one embodiment of the present disclosure.

With reference to FIG. 5, a process 500 is illustrated that restricts access to features of a hardware adapter to authorized features according to another embodiment of the present disclosure. For ease of understanding, process 500 is explained in conjunction with FIG. 1. Process 500 is executed by processor 102 of data processing system 110. For example, process 500 may be implemented in driver 116 (included in OS 114 or VMM 118) for communication adapter 150.

Process 500 is initiated (e.g., at initial execution of driver 116 for communication adapter 150 by processor 102) in block 502, at which point control passes to block 504. In block 504, processor 102 reads an encrypted feature key 158 from communication adapter 150. Encrypted feature key 158 may correspond to a single feature of communication adapter 150 or a set of features for communication adapter 150. Next, in block 506, processor 102 utilizes public key 110 to decrypt encrypted feature key 158 read from communication adapter 150. Then, in decision block 508, processor 102 determines whether the decryption of encrypted feature key 158 with public key 110 produces a valid key (i.e., clear feature key 206).

In response to a valid key not being indicated (i.e., if the decryption of encrypted feature key 158 using public key 110 is not successful) in block 508, control transfers to decision block 510, where processor 102 determines whether enablement of another feature (or feature set) is indicated. In response to enablement of another feature (or feature set) being indicated in block 510, control transfers to block 504. If enablement of another feature (or feature set) is not indicated in block 510, control transfers to block 514 where process 500 terminates and control returns to a calling routine (as the feature is not an authorized feature for communication adapter 150). In response to a valid key being indicated in block 508, control transfers to block 512 where processor 102 issues a feature enablement command with an unencrypted feature key 212 to communication adapter 150. Following block 512, control transfers to block 514 where process 500 terminates and control returns to a calling routine.

Figure 6:
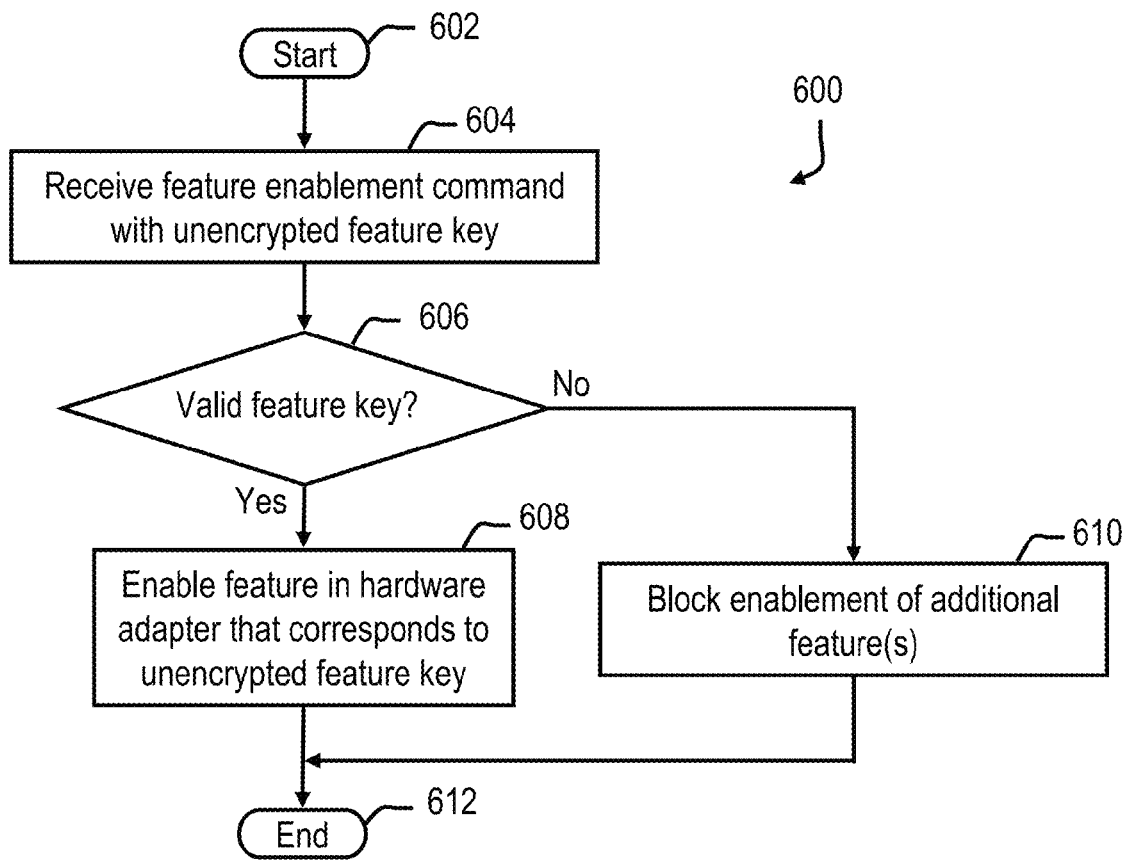
FIG. 6 is a flow chart of yet another exemplary process for implementing access to features of a hardware adapter according to one embodiment of the present disclosure.

With reference to FIG. 6, a flow chart of an exemplary process 600 (executed by processor 152 of communication adapter 150) is illustrated that is utilized to enable an authorized feature (or authorized feature set) of communication adapter 150. For ease of understanding, process 600 is explained in conjunction with FIG. 1. Process 600 may, for example, be implemented when processor 152 executes one or more interface routines 160 of communication adapter 150 in response to receiving a feature enablement command with a unencrypted feature key from processor 102. At block 602, process 600 is initiated at which point control transfers to block 604. In block 604, processor 152 receives (from processor 102) a feature enablement command with a unencrypted feature key 212. Next, in decision block 606, processor 152 determines whether the received unencrypted feature key 212 is valid. In response to the received unencrypted feature key 212 being valid in block 606, control transfers to block 608 where processor 152 enables a feature (or set of features) that correspond to the unencrypted feature key 212. In response to the received unencrypted feature key 212 not being valid in block 606, control transfers to block 610 where processor 152 blocks enablement of an additional feature (or an additional set of features). Following blocks 608 and 610 control transfers to block 612 where process 600 terminates and control returns to a calling routine.

Accordingly, techniques have been disclosed herein that facilitate restricting access to features of a hardware adapter to those authorized for a data processing system in which the hardware adapter is deployed. Advantageously, the disclosed techniques allow a computer system manufacturer to control the usage of features incorporated in a hardware adapter, irrespective of the manufacturer of the adapter or the system in which the adapter is deployed. The disclosed techniques advantageously prevent the exploitation of vendor ID and/or sub-vendor ID spoofing to facilitate use of a non-certified hardware adapter (i.e., a commodity hardware adapter) with device drivers of a computer system.

In the flow charts above, the methods depicted in FIGS. 3-6 may be embodied in a computer-readable medium containing computer-readable code such that a series of steps are performed when the computer-readable code is executed on a computing device. In some implementations, certain steps of the methods may be combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible storage medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage subsystems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for accessing features of a hardware adapter, comprising:
   reading, using a data processing system, a first key from a hardware adapter;
   attempting to decrypt, using the data processing system, the first key with a second key;

in response to the second key successfully decrypting the first key, reading, using the data processing system, encrypted code from the hardware adapter;

in response to the second key successfully decrypting the first key, decrypting, using the data processing system, the encrypted code with the decrypted first key to generate unencrypted code;

in response to the second key successfully decrypting the first key, over-writing, using the data processing system, the unencrypted code over a default code in an executable flash sector of the hardware adapter, wherein the unencrypted code facilitates access to at least one feature of the hardware adapter that is customer specific, and wherein the unencrypted code only allows authorized operating systems and hypervisors to use the at least one feature of the hardware adapter that is customer specific; and in response to the second key not successfully decrypting the first key, refraining from over-writing the default code in the executable flash sector of the hardware adapter, wherein the default code facilitates access to one or more features that are not customer specific and does not facilitate access to the at least one feature of the hardware adapter that is customer specific.

2. The method of claim 1, wherein the first key is an encrypted symmetric key that is encrypted with a vendor specific private key and the second key is a customer specific public key, and wherein the vendor specific private key and the customer specific public key form a key pair that is unique for a given customer.

3. The method of claim 1, wherein the at least one feature of the hardware adapter that is customer specific is a set of customer specific features.

4. The method of claim 1, wherein the at least one feature of the hardware adapter that is customer specific is a single customer specific feature.

5. The method of claim 1, wherein the first key includes multiple first keys each of which corresponds to a different set of customer specific features.

6. The method of claim 1, wherein the first key includes multiple first keys each of which corresponds to a different customer specific feature.

7. The method of claim 1, wherein the at least one feature is selected from the following features: virtual switch; port mirror; port sniffer; port replication; port pass-through; port intrusion prevention and detection; deep packet analysis; link aggregation control protocol hardware negotiation; a number of available virtual functions; enhanced security access control lists; and active port profile migration.

8. A computer program product for accessing features of a hardware adapter, the computer program product comprising:
a computer-readable storage medium having computer-readable program code embodied thereon, wherein the computer-readable program code, when executed by a processor, configures the processor for:
reading a first key from a hardware adapter;
attempting to decrypt the first key with a second key;
in response to the second key successfully decrypting the first key, reading encrypted code from the hardware adapter;
in response to the second key successfully decrypting the first key, decrypting the encrypted code with the decrypted first key to generate unencrypted code;
in response to the second key successfully decrypting the first key, over-writing the unencrypted code over a default code in an executable flash sector of the hardware adapter, wherein the unencrypted code facilitates access to at least one feature of the hardware adapter that is customer specific, and wherein the unencrypted code only allows authorized operating systems and hypervisors to use the at least one feature of the hardware adapter that is customer specific; and
in response to the second key not successfully decrypting the first key, refraining from over-writing the default code in the executable flash sector of the hardware adapter, wherein the default code facilitates access to one or more features that are not customer specific and does not facilitate access to the at least one feature of the hardware adapter that is customer specific.

9. The computer program product of claim 8, wherein the first key is an encrypted symmetric key that is encrypted with a vendor specific private key and the second key is a customer specific public key, and wherein the vendor specific private key and the customer specific public key form a key pair that is unique for a given customer.

10. The computer program product of claim 8, wherein the at least one feature of the hardware adapter that is customer specific is a set of customer specific features.

11. The computer program product of claim 8, wherein the at least one feature of the hardware adapter that is customer specific is a single customer specific feature.

12. The computer program product of claim 8, wherein the first key includes multiple first keys each of which corresponds to a different set of customer specific features.

13. The computer program product of claim 8, wherein the first key includes multiple first keys each of which corresponds to a different customer specific feature.

14. The computer program product of claim 8, wherein the at least one feature is selected from the following features: virtual switch; port mirror, port sniffer, and port replication; port pass-through, and port intrusion prevention and detection; deep packet analysis; link aggregation control protocol (LACP) hardware negotiation; a number of available virtual functions (VFs); enhanced security access control lists (ACLs); and active port profile migration.

15. A data processing system, comprising:
a memory for storing code; and
a processor coupled to the memory, wherein the processor is configured for:
reading a first key from a hardware adapter;
attempting to decrypt the first key with a second key;
in response to the second key successfully decrypting the first key, reading encrypted code from the hardware adapter;
in response to the second key successfully decrypting the first key, decrypting the encrypted code with the decrypted first key to generate unencrypted code;
in response to the second key successfully decrypting the first key, over-writing the unencrypted code over a default code in an executable flash sector of the hardware adapter, wherein the unencrypted code facilitates access to at least one feature of the hardware adapter that is customer specific, and wherein the unencrypted code only allows authorized operating systems and hypervisors to use the at least one feature of the hardware adapter that is customer specific; and
in response to the second key not successfully decrypting the first key, refraining from over-writing the default code in the executable flash sector of the hardware adapter, wherein the default code facilitates access to one or more features that are not customer specific and does not facilitate access to the at least one feature of the hardware adapter that is customer specific.

16. The data processing system of claim 15, wherein the first key is an encrypted symmetric key that is encrypted with a vendor specific private key and the second key is a customer specific public key, and wherein the vendor specific private key and the customer specific public key form a key pair that is unique for a given customer.

17. The data processing system of claim 15, wherein the at least one feature of the hardware adapter that is customer specific is a set of customer specific features.

18. The data processing system of claim 15, wherein the at least one feature of the hardware adapter that is customer specific is a single customer specific feature.

19. The data processing system of claim 15, wherein the first key includes multiple first keys each of which corresponds to a different set of customer specific features.

20. The data processing system of claim 15, wherein the first key includes multiple first keys each of which corresponds to a different customer specific feature.

21. A method for accessing features of a hardware adapter, comprising:
    reading, using a data processing system, a first key from a hardware adapter;
    attempting to decrypt, using the data processing system, the first key with a second key; and
    in response to the second key successfully decrypting the first key, transmitting, using the data processing system, a feature enablement command and the decrypted first key to the hardware adapter to facilitate enablement of at least one feature of the hardware adapter that is customer specific, wherein the feature enablement command and the decrypted first key are utilized to enable the use of the at least one feature of the hardware adapter that is customer specific by authorized operating systems and hypervisors and to prevent use of the at least one feature of the hardware adapter that is customer specific by unauthorized operating systems and hypervisors.

22. The method of claim 21, wherein the first key is an encrypted symmetric key that is encrypted with a vendor specific private key and the second key is a customer specific public key, and wherein the vendor specific private key and the customer specific public key form a key pair that is unique for a given customer.

23. The method of claim 21, wherein the at least one feature of the hardware adapter that is customer specific is a set of customer specific features.

24. The method of claim 21, wherein the at least one feature of the hardware adapter that is customer specific is a single customer specific feature.

25. The method of claim 21, wherein the at least one feature is selected from the following features: virtual switch; port mirror; port sniffer; port replication; port pass-through; port intrusion prevention and detection; deep packet analysis; link aggregation control protocol hardware negotiation; a number of available virtual functions; enhanced security access control lists; and active port profile migration.

* * * * *